J. W. REED.
Plows.

No. 135,289.  Patented Jan. 28, 1873.

Witnesses:
A. W. Almqvist
Francis McArdle

Inventor:
Joseph W. Reed
Per
Attorneys.

UNITED STATES PATENT OFFICE.

JOSEPH W. REED, OF CAREYVILLE, MISSOURI.

IMPROVEMENT IN PLOWS.

Specification forming part of Letters Patent No. 135,289, dated January 28, 1873.

*To all whom it may concern:*

Figure 1:
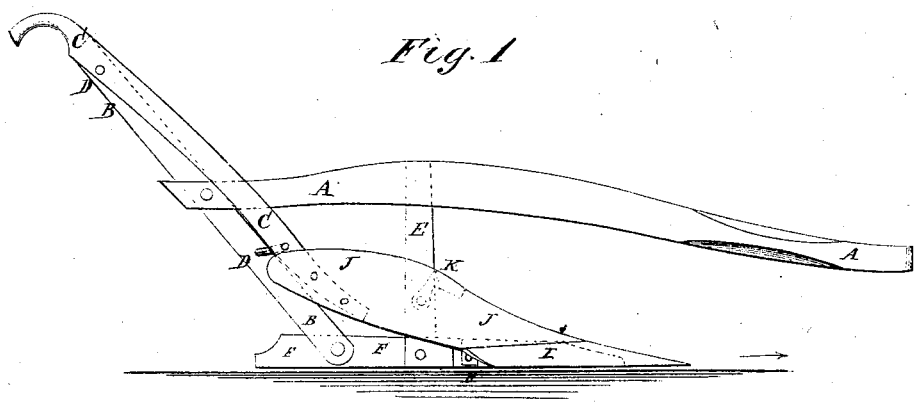
Figure 2:
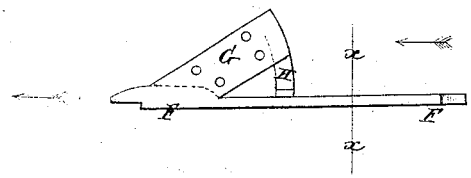
Figure 3:
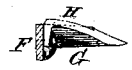

Be it known that I, JOSEPH W. REED, of Careyville, in the county of Pike and State of Missouri, have invented a new and useful Improvement in Sod-Plow, of which the following is a specification:

Figure 1 is a side view of my improved plow. Fig. 2 is a detail top view of the land-side, bed-plate, and brace. Fig. 3 is a rear view of the same, partly in section, through the line $x\ x$, Fig. 2.

My invention has for its object to furnish an improved plow for breaking up prairie sod, which shall be so constructed as to be of easier draft than plows as heretofore constructed, while doing the work equally well, so that two horses may do with ease the work which requires three or four horses when the ordinary plows are used; and it consists in the construction of various parts of the plow, as hereinafter more fully described.

A is the plow-beam. B is the land-side handle, which is bolted to the rear end of the plow-beam A, and the lower end of which is bolted to the rear part of the land-side. C is the mold-board handle, which is connected with the handle B by rounds D, and the lower end of which is bolted to the rear part of the mold-board. E is the standard, the upper end of which is bolted or otherwise secured to the beam A, and to its lower end is bolted the land-side F. To the forward end of the land-side F is welded the land-side end of the bed-plate G, the outer end of which is supported by the brace H, the inner end of which is bolted to the land-side F. The bed-plate G is made wide, so that it may receive and support the rear part of the share I and the forward part of the mold-board J. The bed-plate G is made thin, and is welded to the land-side F, so that it may be close down to the bottom of the furrow, and its outer end projects to the outer part of the share I, so as to fully support it. The land-side F is made long, so that the share I may project forward about six inches further than in an ordinary plow. This, in connection with the construction of the bed-plate G and land-side F, enables the share I and mold-board J to be made with such a gradual rise that they may pass the standard E about three inches lower than in an ordinary plow. The mold-board J is connected with the standard E by a short bent or twisted bar, K, as shown in Fig. 1.

Having thus described my invention, I claim as new and desire to secure by Letters Patent—

The perpendicular standard E attached at one end to beam A, and at the other to land-side F, combined with a mold-board, J, and twisted bar K, all arranged and applied as and for the purpose described.

JOSEPH W. REED.

Witnesses:
E. I. EDWARDS,
J. T. ADAMS.